(12) United States Patent
Mese et al.

(10) Patent No.: US 11,188,607 B2
(45) Date of Patent: Nov. 30, 2021

(54) DESTINATION INFORMATION ASSOCIATED WITH A HYPERLINK

(71) Applicant: Lenovo (Singapore) Pte. Ltd., Singapore (SG)

(72) Inventors: John Carl Mese, Cary, NC (US); Nathan J. Peterson, Oxford, NC (US); Mark Patrick Delaney, Raleigh, NC (US); Russell Speight VanBlon, Raleigh, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/460,607

(22) Filed: Jul. 2, 2019

(65) Prior Publication Data
US 2021/0004426 A1   Jan. 7, 2021

(51) Int. Cl.
| | |
|---|---|
| *G06F 16/955* | (2019.01) |
| *G06Q 30/02* | (2012.01) |
| *G06F 3/0481* | (2013.01) |
| *H04L 29/08* | (2006.01) |
| *G06F 3/01* | (2006.01) |
| *G06F 40/134* | (2020.01) |
| *G06F 3/0484* | (2013.01) |

(52) U.S. Cl.
CPC .......... *G06F 16/9558* (2019.01); *G06F 3/013* (2013.01); *G06F 3/0481* (2013.01); *G06F 40/134* (2020.01); *G06Q 30/0277* (2013.01); *H04L 67/02* (2013.01); *H04L 67/2847* (2013.01); *G06F 3/04842* (2013.01)

(58) Field of Classification Search
CPC ........ G06Q 10/07; G06Q 30/00; G06F 3/014; G06F 3/048; G06F 40/13; G06F 16/95; G06F 16/00; G06F 40/00; G06F 3/00; G06F 30/02; H04L 67/00
See application file for complete search history.

(56) References Cited

U.S. PATENT DOCUMENTS

| | | | | |
|---|---|---|---|---|
| 7,028,032 | B1 * | 4/2006 | Diedrich | G06F 16/9562 |
| 2004/0021793 | A1 * | 2/2004 | Takatori | H04H 20/93 348/461 |
| 2005/0108299 | A1 * | 5/2005 | Nakajima | G06F 16/9574 |
| 2006/0253578 | A1 * | 11/2006 | Dixon | G06Q 10/06 709/225 |
| 2007/0083750 | A1 * | 4/2007 | Miura | H04L 63/0807 713/155 |
| 2007/0282802 | A1 * | 12/2007 | Wilhelm | G06F 16/9562 |
| 2009/0177754 | A1 * | 7/2009 | Brezina | G06Q 10/107 709/206 |
| 2011/0022559 | A1 * | 1/2011 | Andersen | G06F 21/52 706/47 |

(Continued)

*Primary Examiner* — Jennifer N Welch
*Assistant Examiner* — Qi Wan
(74) *Attorney, Agent, or Firm* — Ference & Associates LLC

(57) ABSTRACT

One embodiment provides a method, including: identifying, at an information handling device, a presence of a hyperlink; determining, using a processor, destination information associated with the hyperlink; and presenting, based on the determining and prior to activating the hyperlink; the destination information to a user. Other aspects are described and claimed.

16 Claims, 3 Drawing Sheets

(56) References Cited

U.S. PATENT DOCUMENTS

| | | | |
|---|---|---|---|
| 2011/0208801 A1* | 8/2011 | Thorkelsson | H04L 67/2814 709/203 |
| 2013/0117376 A1* | 5/2013 | Filman | G06F 40/166 709/205 |
| 2014/0041029 A1* | 2/2014 | Zhou | H04L 63/20 726/22 |
| 2016/0335669 A1* | 11/2016 | Hottes | G06Q 30/0257 |
| 2017/0212583 A1* | 7/2017 | Krasadakis | G06F 3/013 |
| 2019/0164196 A1* | 5/2019 | Tang | G06N 5/02 |

\* cited by examiner

DESTINATION INFORMATION ASSOCIATED WITH A HYPERLINK

BACKGROUND

Users frequently utilize their information handling devices ("devices"), for example, smart phones, tablet devices, laptop and/or personal computers, and the like, to browse through various webpages. Many webpages contain one or more advertisements ("ads") that may be presented to the user (e.g., stagnant ads that are located on the edges of the webpage and/or within areas of the page content, pop-up ads that open in a new window, etc.). To limit the volume of ads they encounter, some users may employ an ad-blocker browser extension to disable the ads from appearing.

BRIEF SUMMARY

In summary, one aspect provides a method, comprising: identifying, at an information handling device, a presence of a hyperlink; determining, using a processor, destination information associated with the hyperlink; and presenting, based on the determining and prior to activating the hyperlink, the destination information to a user.

Another aspect provides an information handling device, comprising: a processor; a memory device that stores instructions executable by the processor to: identify a presence of a hyperlink; determine destination information associated with the hyperlink; and present, based on the determining and prior to activating the hyperlink, the destination information to a user.

A further aspect provides a product, comprising: a storage device that stores code, the code being executable by a processor and comprising: code that identifies a presence of a hyperlink; code that determines destination information associated with the hyperlink; and code that presents, based on the determining and prior to activating the hyperlink, the destination information to a user.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
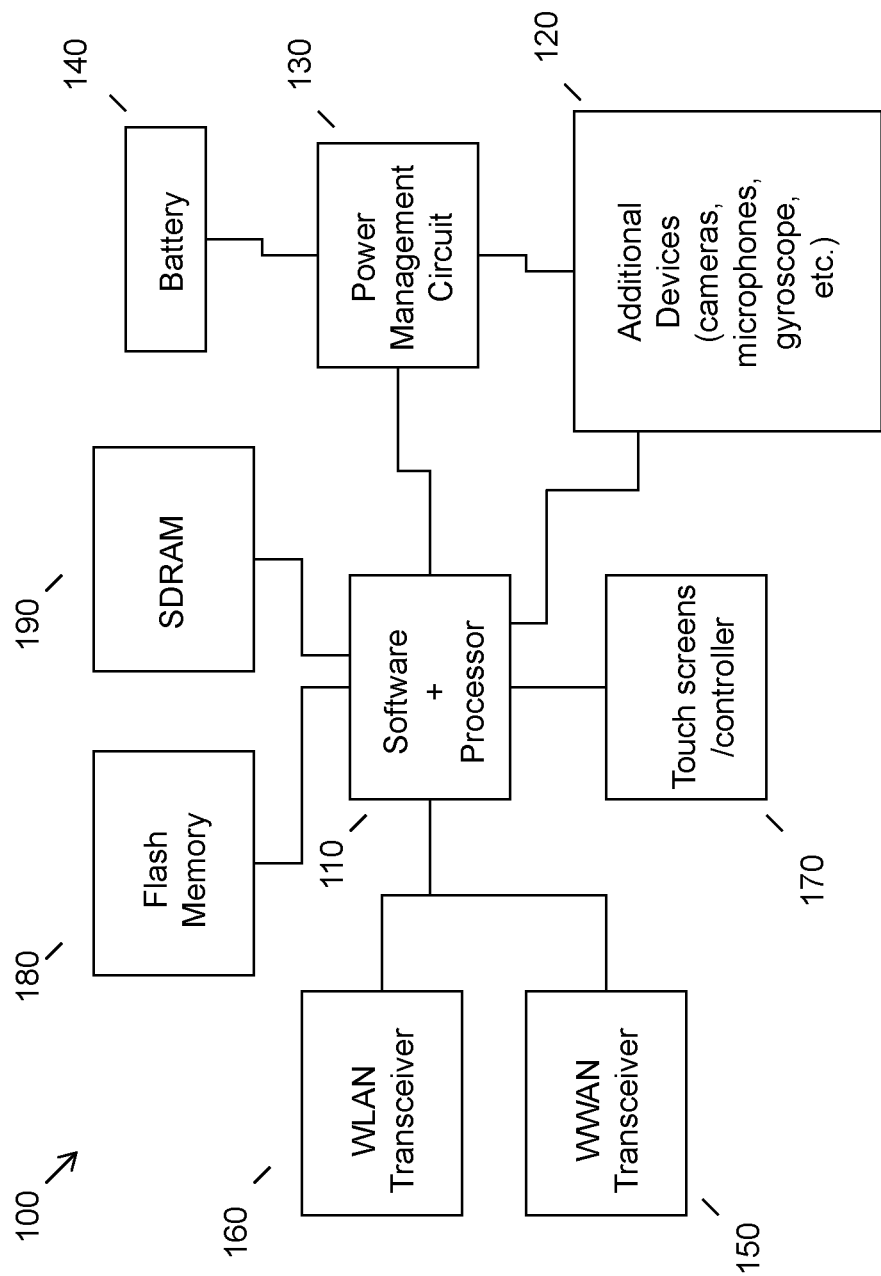
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Webpages having an abundance of ads may negatively affect a user's browsing experience. More particularly, these ads may interfere with the user's ability to visualize the desired web-content, may slow down their system by consuming system resources, may create other browsing issues, and the like. As such, some users opt to use an ad-blocker to disable ads from appearing in order to improve their overall web-browsing experience.

Many web sites now have the capability to detect ad-blockers and may require users to disable their ad-blocker before accessing the content on the website. For example, some websites may be ad-supported and rely on ad viewership to remain operational. In these situations, a notification may be presented to the user (e.g., near the top of their browser or search bar, etc.) informing them that their ad-blocker needs to be disabled to access the content on the website. If a user does not disable their ad-blocker then they may not be able to properly interact with the links and/or media on the website. Additionally or alternatively, a user may be forced to find their desired information from another source. In view of the foregoing, many users often become frustrated when navigating to a website only to discover that the website contains a plurality of ads or that they need to take additional actions to access the desired content.

Accordingly, an embodiment provides a method for presenting information about a webpage to a user prior to the user actually accessing the webpage. In an embodiment, a hyperlink may be identified on a page. For example, the hyperlink may be resident on an existing webpage the user is currently on, may be present in a received communication (e.g., an email, an SMS text message, a social media message, etc.), and the like. An embodiment may then determine destination information associated with the hyperlink. The destination information may include, inter alia, ad-based information (e.g., ad-volume, ad-rating, effect on an ad-blocker, etc.) related to a website associated with the hyperlink. Thereafter, the destination information may be presented to the user prior to the user activating the hyperlink (e.g., when a user hovers over the link the destination information is presented to the user in a notification box, etc.). Such a method may apprise the user of the ad situation on a destination website and may allow the user to choose if they want to deal with that situation or go to another source to find their desired information.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, etc. System 100 often includes one or more touch screens 170 for data input and display/rendering. System 100 also typically includes various memory devices, for example flash memory 180 and SDRAM 190.

Figure 2:
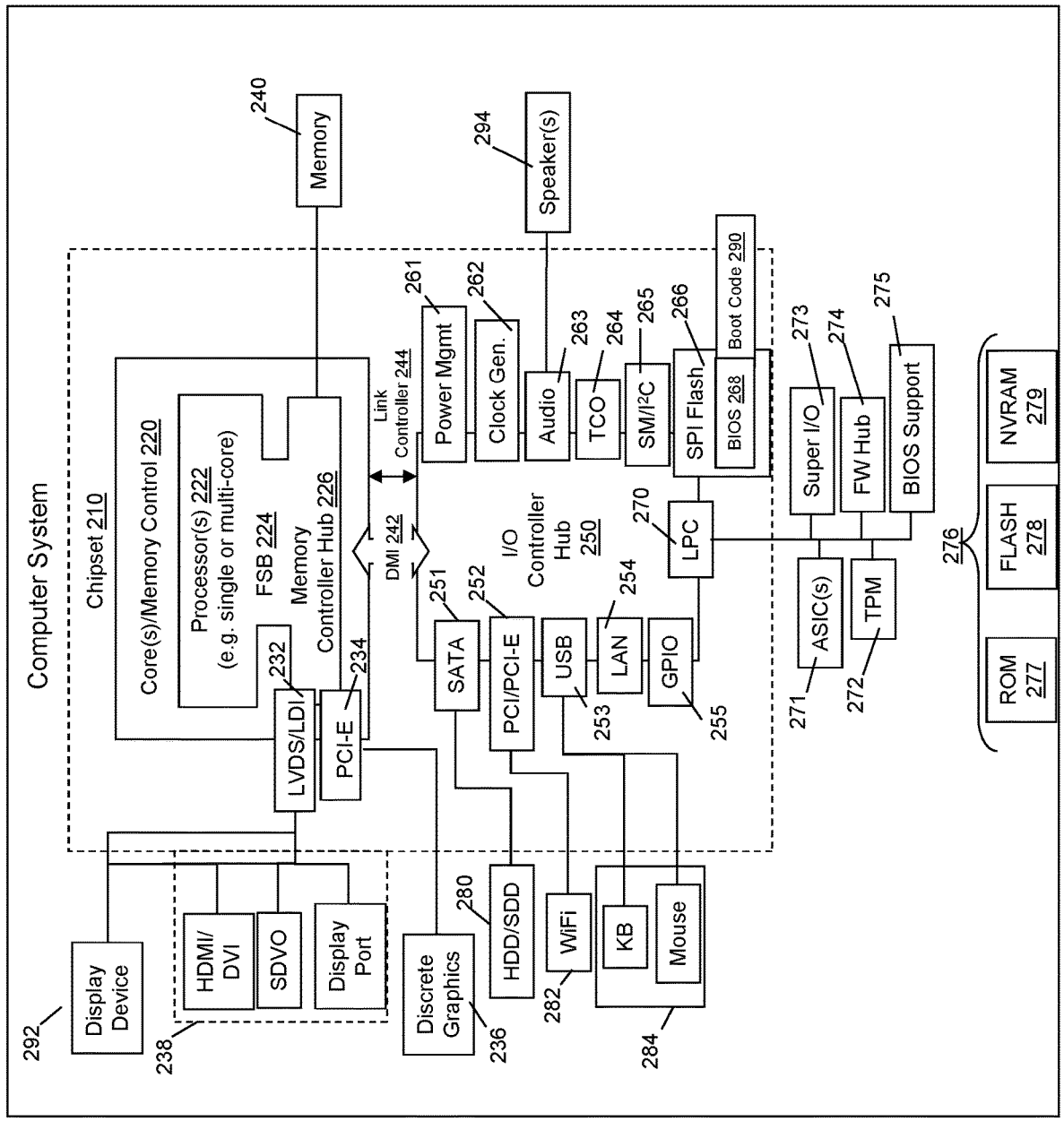
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart TVs, laptops, and/or other electronic devices that may be able to support media streams or provide media output. For example, the circuitry outlined in FIG. 1 may be implemented in a tablet or smart phone embodiment, whereas the circuitry outlined in FIG. 2 may be implemented in a laptop.

Figure 3:
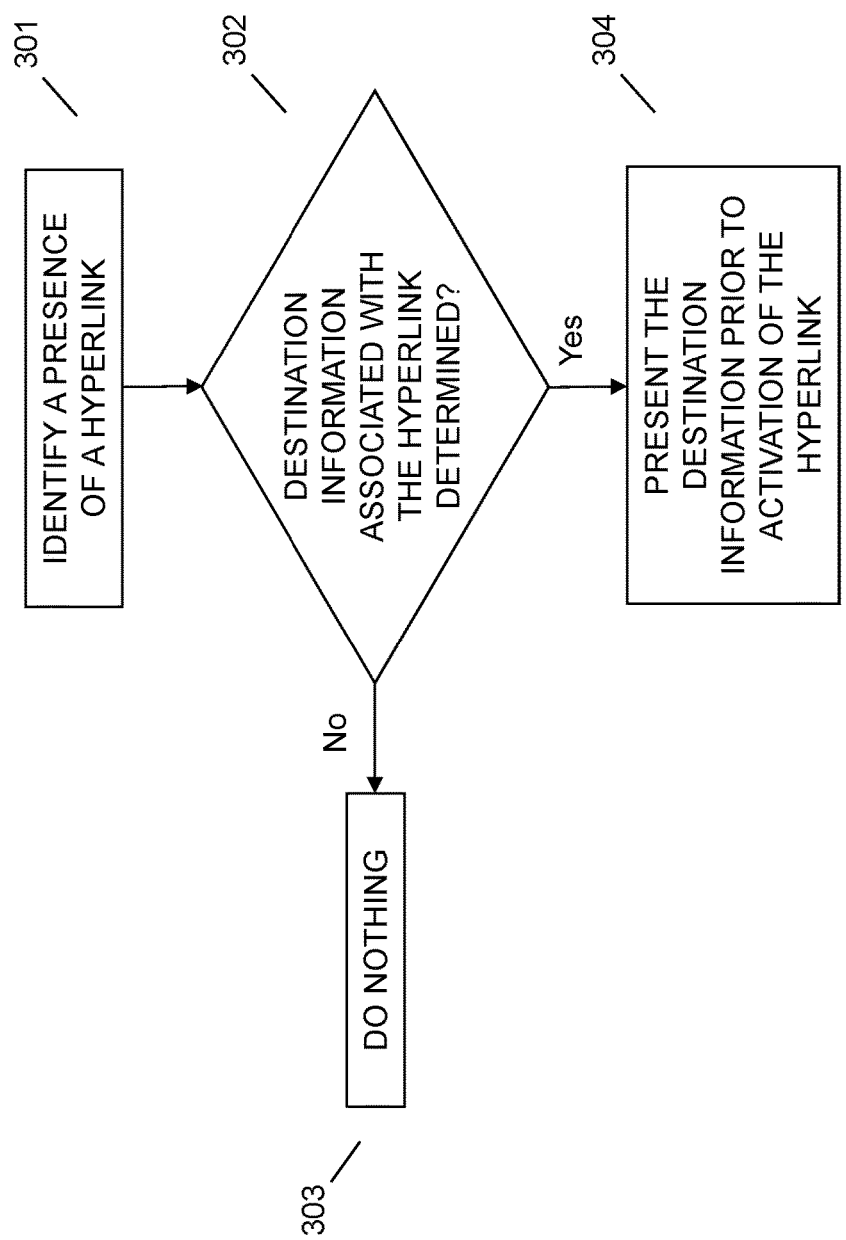
FIG. 3 illustrates an example method of presenting destination information of a webpage to a user prior to navigating to the webpage.

Referring now to FIG. 3, an embodiment may present destination information to a user for a website associated with a hyperlink prior to the user activating the hyperlink. At 301, an embodiment may identify a presence of a hyperlink. In an embodiment, the hyperlink may be resident on an active page/application. For example, the hyperlink may be present on a website, in a received communication (e.g., an email, an SMS text message, a social media message, etc.), another application, and the like. In an embodiment, the hyperlink may be presented in a particular format (e.g., as in-line text, as an image or video, as an icon, a combination thereof, and the like). In an embodiment, the identification of the hyperlink may be conducted using one or more conventional hyperlink identification techniques.

At 302, an embodiment may determine destination information associated with the hyperlink. In an embodiment, the destination information may be information related to a website associated with the hyperlink. For example, the destination information may identify the theme of the website (e.g., sports page, news page, entertainment page, etc.), the safety of the website, types of content on the website (e.g., primarily text-based, primarily video-based, etc.), a summary of all of the foregoing, and the like. Additionally or alternatively, the destination information may comprise various types of ad-based information associated with the website. For example, the destination information may comprise an ad-level or volume, an ad-rating (e.g., safe, not safe, etc.), an effect on an ad-blocker (e.g., ad-blocker may remain enabled to view the page contents, ad-blocker must be disabled to view the page contents, etc.).

In an embodiment, the destination information may be determined prior to a user actually activating the hyperlink. For instance, the determination may be initiated when a relevant page is initially loaded or when a communication comprising the hyperlink is received. More particularly, an embodiment may pre-fetch and analyze the hyperlinks to determine the content loaded on the associated webpages. Additionally or alternatively, the hyperlinks may be cross-referenced with crowd-sourced data (e.g., stored on another website, stored at another accessible storage location, etc.) that may provide an indication of the type of ad-based information of a particular website in a short review or recommendation.

Responsive to not determining, at 302, destination information associated with the hyperlink, an embodiment may, at 303, take no additional action. Conversely, responsive to determining, at 302, destination information associated with the hyperlink, an embodiment may, at 304, present the destination information to a user.

In an embodiment, the destination information may be presented to the user before the user activates the hyperlink. For example, an embodiment may detect that a user is providing hover input over the hyperlink (e.g., with their mouse, stylus, finger, etc.) and thereafter present the destination information in response to the detection. As another example, an embodiment may detect that a user is providing a long or hard press on the hyperlink and thereafter present the destination information in response to that detection. In yet another example, an embodiment may utilize one or more gaze detection techniques to determine whether a user's gaze is focused on a location associated with the hyperlink. Responsive to determining that the user's gaze is fixed on the hyperlink location (e.g., for a predetermined amount of time, etc.), then an embodiment may conclude that a user wishes to be presented with the destination information.

In an embodiment, the destination information may be presented in one or more different ways. For example, the destination information may be presented in a pop-up box proximate to the hyperlink location. In another example, the destination information may be presented on a dedicated page that is different from the active page. In yet another example, all of the hyperlinks resident on a page or in a communication may be marked up (e.g., with colors, with text, etc.) so as to present the destination information to the user for the entirety of their viewing duration. Other destination information presentation techniques not explicitly described here may also be utilized.

In an embodiment, other types of information may be presented to the user in lieu of or in addition to the destination information. For example, an embodiment may provide the user with an alternative source (e.g., another website, etc.) that is similar in nature to the website associated with a particular hyperlink. The alternative source may have been identified as having less ads or less of an effect on a user's ad-blocker than the website associated with the hyperlink.

The various embodiments described herein thus represent a technical improvement to conventional website information presentation techniques. Using the techniques described herein, an embodiment may identify the presence of a hyperlink (e.g., on an active page, in a received communication, etc.). An embodiment may then determine destination information associated with a website corresponding to the hyperlink. The destination information may include ad-based information associated with the website (e.g., ad-level, ad-rating, ad-blocker effect, etc.). Responsive to determining the destination information, an embodiment may thereafter present the destination information to a user prior to the user activating the hyperlink. Such a method may inform a user about the ad situation on a website prior to the user actually accessing that site.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    identifying, at an information handling device, a presence of a hyperlink;
    determining, using a processor, destination information associated with the hyperlink, wherein the destination information comprises:
        subject matter information of a webpage associated with the hyperlink, wherein the webpage is part of a first website; and
        advertisement-based information of the webpage, wherein the advertisement-based information comprises an indication of advertisement volume on the webpage; and
    presenting, based on the determining and prior to activating the hyperlink and responsive to identifying at least one of: a long press and a hover input directed toward the hyperlink, an alternative webpage to a user, wherein the alternative webpage is part of a second website, different than the first website, and wherein the alternative webpage comprises:
        information similar to the subject matter information; and
        a lower advertisement volume than the webpage.

2. The method of claim 1, wherein the hyperlink is a component of a received transmission.

3. The method of claim 1, wherein the destination information comprises a summary of content on a webpage associated with the hyperlink.

4. The method of claim 1, wherein the advertisement-based information further comprises at least one of: an advertisement-level, an advertisement rating, and an advertisement-blocker effect.

5. The method of claim 1, wherein the determining comprises:
    prefetching content of a webpage associated with the hyperlink; and
    analyzing the content on the webpage to determine the destination information.

6. The method of claim 1, wherein the determining comprises accessing, at an accessible storage database, crowd-sourced data comprising the destination information.

7. The method of claim 1, wherein the presenting comprises presenting responsive to identifying that a gaze location of a user is directed toward the hyperlink.

8. An information handling device, comprising:
    a processor;
    a memory device that stores instructions executable by the processor to:
    identify a presence of a hyperlink;
    determine destination information associated with the hyperlink, wherein the destination information comprises:
        subject matter information of a webpage associated with the hyperlink, wherein the webpage is part of a first webpage; and
        advertisement-based information of the webpage, wherein the advertisement-based information comprises an indication of advertisement volume on the webpage; and
    present, based on the determining and prior to activating the hyperlink and responsive to identifying at least one of: a long press and a hover input directed toward the hyperlink, an alternative webpage to a user, wherein the alternative webpage is part of a second website, different than the first website, and wherein the alternative webpage comprises:
        information similar to the subject matter information; and
        a lower advertisement volume than the webpage.

9. The information handling device of claim 8, wherein the hyperlink is a component of a received transmission.

10. The information handling device of claim 8, wherein the destination information comprises a summary of content on a webpage associated with the hyperlink.

11. The information handling device of claim 8, wherein the advertisement-based information comprises at least one of: an advertisement-level, an advertisement rating, and an advertisement-blocker effect.

12. The information handling device of claim 8, wherein the instructions executable by the processor to determine comprise instructions executable by the processor to:
    prefetch content of a webpage associated with the hyperlink; and
    analyze the content on the webpage to determine the destination information.

13. The information handling device of claim 8, wherein the instructions executable by the processor to determine comprise instructions executable by the processor to access, at an accessible storage database, crowd-sourced data comprising the destination information.

14. The information handling device of claim 8, wherein the instructions executable by the processor to present comprise instructions executable by the processor to present responsive to identifying at least one of: a long press and hover input directed toward the hyperlink.

15. The information handling device of claim 8, wherein the instructions executable by the processor to present comprise instructions executable by the processor to present responsive to identifying that a gaze location of a user is directed toward the hyperlink.

16. A product, comprising:
    a storage device that stores code, the code being executable by a processor and comprising:
    code that identifies a presence of a hyperlink;

code that determines destination information associated with the hyperlink, wherein the destination information comprises:
  subject matter information of a webpage associated with the hyperlink, wherein the page is part of a first website; and
  advertisement-based information of the webpage, wherein the advertisement-based information comprises an indication of advertisement volume on the webpage; and
code that presents, based on the determining and prior to activating the hyperlink and responsive to identifying at least one of: a long press and a hover input directed toward the hyperlink, an alternative webpage to a user, wherein the alternative webpage is part of a second website, different than the first website, and wherein the alternative webpage comprises:
  information similar to the subject matter information; and
a lower advertisement volume than the webpage.

* * * * *